US012559923B2

(12) United States Patent
Chung

(10) Patent No.: US 12,559,923 B2
(45) Date of Patent: Feb. 24, 2026

(54) CONNECTION STRUCTURE OF BALL VALVE OF CONTROL VALVE FOR DRAINING WATER OUT OF WATER SINK

(71) Applicant: Greatness Sanitary Industrial Co., Ltd, Changhua County (TW)

(72) Inventor: Min-Chih Chung, Changhua County (TW)

(73) Assignee: GREATNESS SANITARY INDUSTRIAL CO., LTD., Changhua County (TW)

( * ) Notice: Subject to any disclaimer, the term of this patent is extended or adjusted under 35 U.S.C. 154(b) by 83 days.

(21) Appl. No.: 18/659,005

(22) Filed: May 9, 2024

(65) Prior Publication Data

US 2025/0347094 A1     Nov. 13, 2025

(51) Int. Cl.
| | |
|---|---|
| *E03C 1/23* | (2006.01) |
| *E03C 1/262* | (2006.01) |
| *F16K 5/06* | (2006.01) |

(52) U.S. Cl.
CPC ............ *E03C 1/2302* (2013.01); *E03C 1/262* (2013.01); *F16K 5/0647* (2013.01); *E03C 2001/2315* (2013.01)

(58) Field of Classification Search
CPC ................... E03C 1/2302; E03C 1/262; E03C 2001/2315; F16K 5/0647
See application file for complete search history.

(56) References Cited

U.S. PATENT DOCUMENTS

| | | | | |
|---|---|---|---|---|
| 6,058,526 A | * | 5/2000 | Parisi ........................ | E03C 1/23 |
| | | | | 4/287 |
| 6,609,259 B2 | * | 8/2003 | Cantrell .................... | E03C 1/23 |
| | | | | 4/640 |
| 9,194,111 B2 | * | 11/2015 | Bohacik ................ | F16K 5/0652 |
| 2025/0283315 A1 | * | 9/2025 | Shih .......................... | E03C 1/26 |

* cited by examiner

*Primary Examiner* — Janie M Loeppke
(74) *Attorney, Agent, or Firm* — LANWAY IPR SERVICES; Chun-Ming Shih

(57) ABSTRACT

A connection structure of a ball valve of a control valve for draining water out of a water sink contains: a body, a filtration cap, the ball valve, a handle bar, and a positioning ring. The body includes a first connecting portion configured to connect with the filtration cap, a second connecting portion configured to accommodate the ball valve, a coupling portion, and a fixing portion. The filtration cap includes multiple filtering orifices configured to guide wasted water into the body. The ball valve is spherical and is received in the second connecting portion, and the includes a guide orifice passing and a connection portion. The handle bar is inserted into the coupling portion and connected with the connection portion so that the handle bar is engaged by the handle bar to be turned on/off. The positioning ring is received in the fixing portion.

4 Claims, 5 Drawing Sheets

CONNECTION STRUCTURE OF BALL VALVE OF CONTROL VALVE FOR DRAINING WATER OUT OF WATER SINK

TECHNICAL FIELD

The present invention relates to a water discharge of a water sink, and more particularly to a connection structure of a ball valve of control valve for discharging water out of the water sink to avoid a removal and a water leakage of the connection structure.

BACKGROUND

Referring to FIG. 1, a conventional connection structure of a ball valve of a control valve for draining water out of a water sink contains a Tee body A, and a filtration cap B, a positioning ring C and a ball valve D which are connected in the Tee body A. The Tee body A has a handle bar E configured to engage with the ball valve D. Thereby, the handle bar E is manually rotated to turn on/off the ball valve D, thus discharging wasted water out of the water sink.

The positioning ring C is fixed on the ball valve D. When the ball valve D is rotated to a recess D1, the filtration cap B is not flat to remove the handle bar E, and dirt in the water sink will remain in the positioning ring C or a slit. Also, the ball valve D, the positioning ring C, and the filtration cap B are connected in turn to cause troublesome connection, maintenance, and disconnection.

The present invention has arisen to mitigate and/or obviate the afore-described disadvantages.

SUMMARY

The primary aspect of the present invention is to provide a connection structure of a ball valve of a control valve for draining water out of a water sink which is capable of avoiding a removal, an abrasion and water leakage and obtaining an easy connection.

To obtain above-mentioned aspect, a connection structure of a ball valve of a control valve provided by the present invention contains: a body, a filtration cap, the ball valve, a handle bar, and a positioning ring.

The body is a hollow tube, and the body includes a first connecting portion formed on a top thereof and configured to connect with the filtration cap, a second connecting portion formed on a bottom of the first connecting portion in a vertical direction of the body and configured to accommodate the ball valve, a coupling portion extending horizontally along the second connecting portion, and a fixing portion formed on a bottom of the second connecting portion.

The filtration cap includes multiple filtering orifices defined therein and configured to guide the wasted water into the body.

The ball valve is spherical and is received in the second connecting portion from a bottom of the body, wherein the ball valve includes a guide orifice passing therethrough, a connection portion extending along a horizontal direction of the guide orifice, wherein the handle bar is inserted into the coupling portion and connected with the connection portion so that the handle bar is engaged by the handle bar to be turned on/off.

The positioning ring is received in the fixing portion from the bottom of the body, and the ball valve includes a washers fixed between the ball valve and the positioning ring to avoid a water leakage of the body.

Preferably, the filtration cap does not contact with the positioning ring, and the ball valve and the positioning ring are received in the second connecting portion and the fixing portion from the bottom of the body.

Preferably, the body further includes a discharge orifice defined on an end thereof opposite to the coupling portion.

Preferably, the ball valve includes two washers fixed on a top and a bottom thereof.

Thereby, the connection structure of a ball valve has advantages as follows:

1) The body is machined easily.
2) The filtration cap does not contact with the positioning ring to cause the unflatness and the removal of the filtration cap.
3) The ball valve and the positioning ring are received in the second connecting portion and the fixing portion from the bottom of the body, thus connecting the ball valve, the positioning ring and the body easily.
4) The ball valve, the positioning ring and the body are detachable easily to obtain easy maintenance, and the ball valve and the positioning ring do not accommodate the dirt.

DETAILED DESCRIPTION

Figure 1:
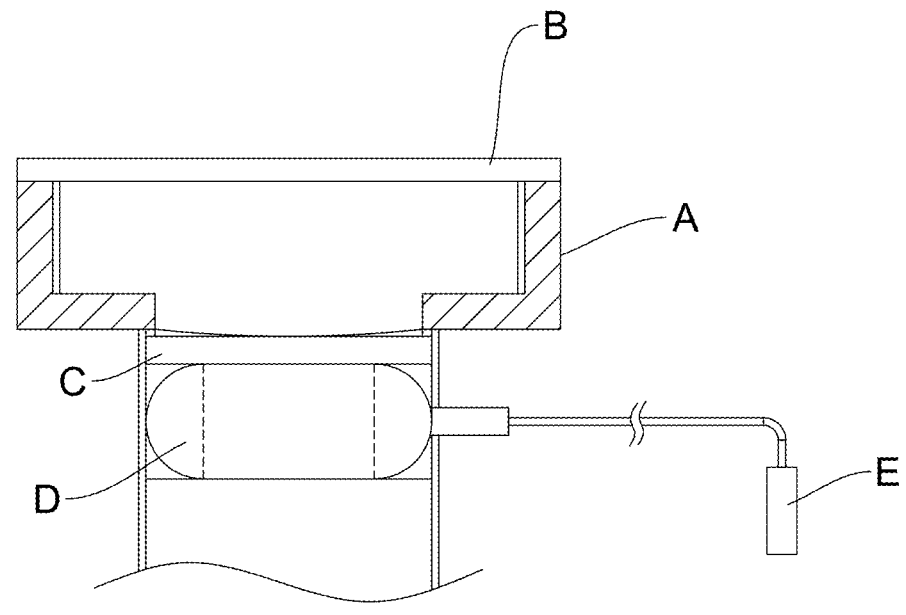
FIG. 1 is a cross sectional view showing a conventional connection structure of a ball valve of a control valve for draining water out of a water sink.
Figure 1:
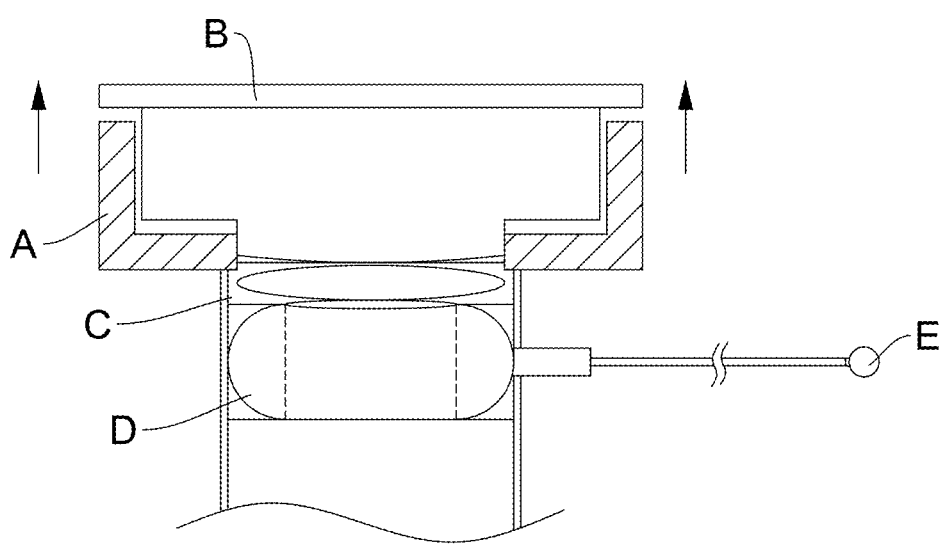
Figure 2:
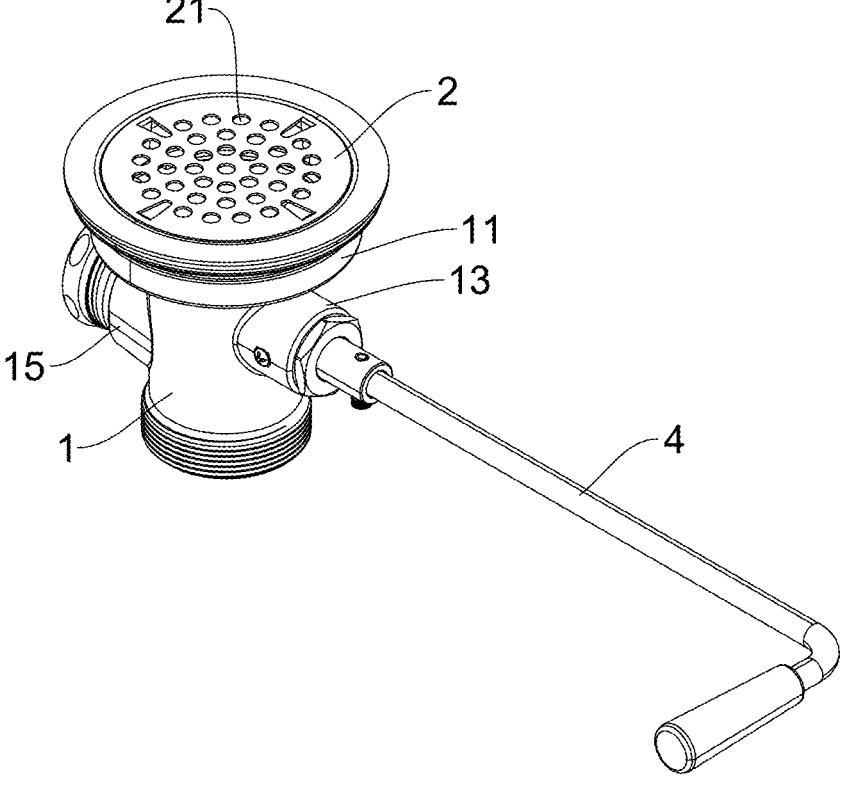
FIG. 2 is a perspective view showing the assembly of a connection structure of a ball valve of a control valve according to a preferred embodiment of the present invention.
Figure 3:
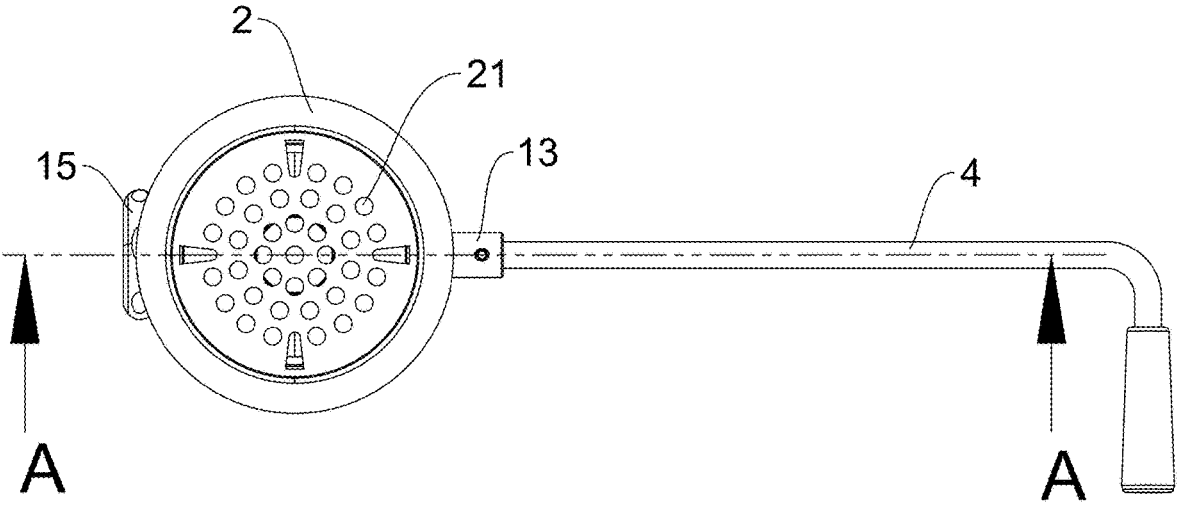
FIG. 3 is a top plan view showing the assembly of the connection structure of the ball valve of the control valve according to the preferred embodiment of the present invention.
Figure 4:
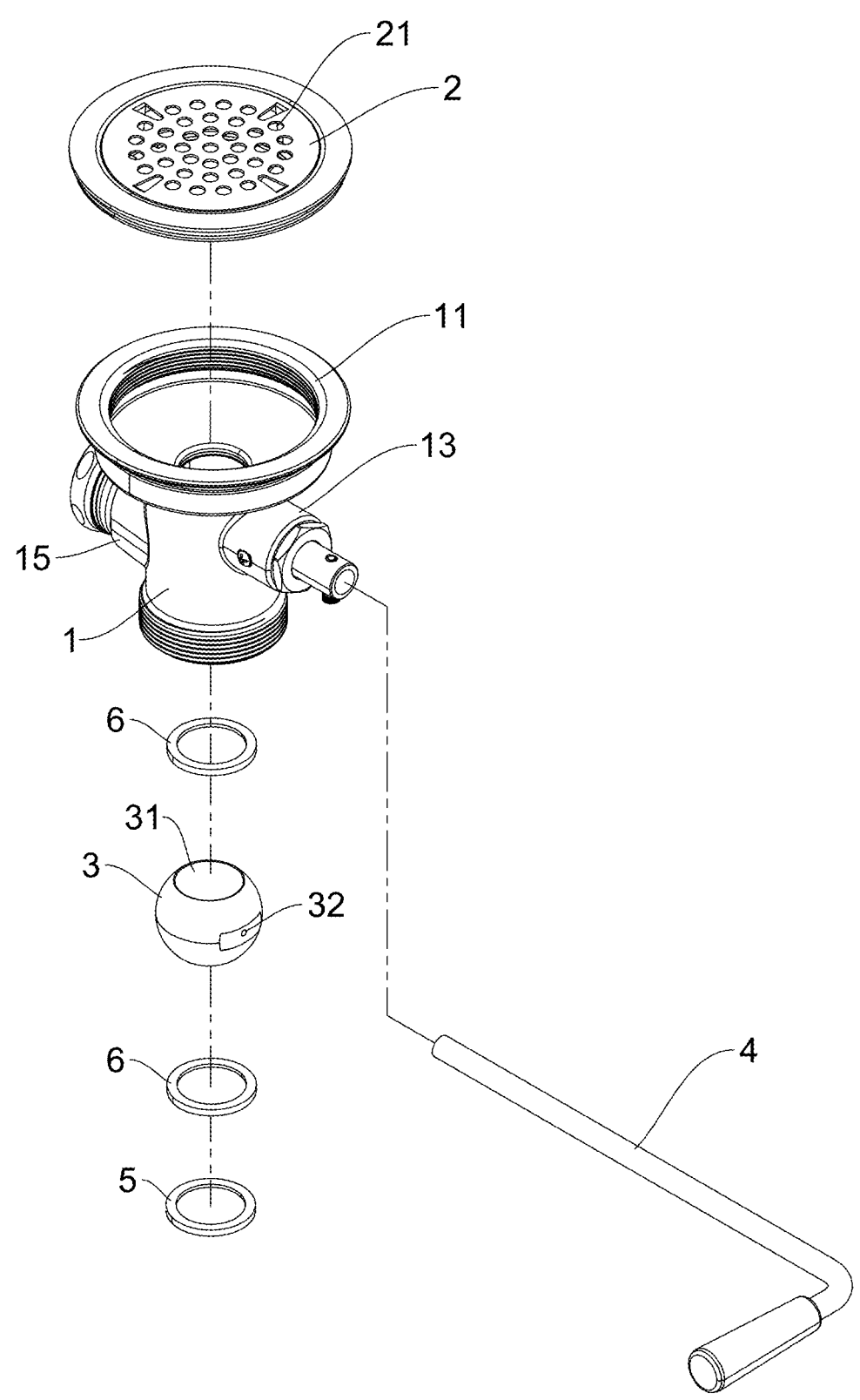
FIG. 4 is a perspective view showing the exploded components of the connection structure of the ball valve of the control valve according to the preferred embodiment of the present invention.
Figure 5:
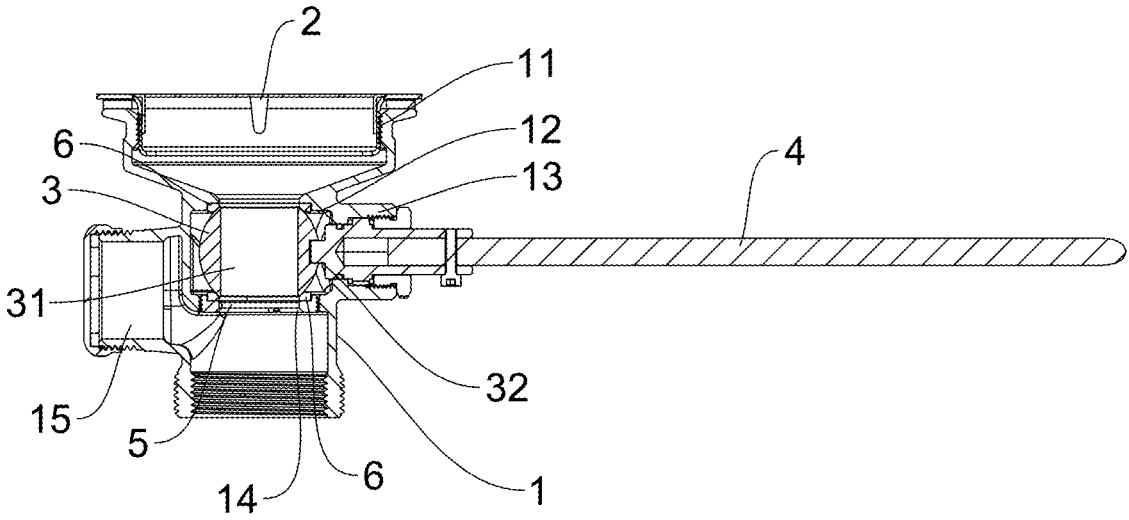
FIG. 5 is a cross sectional view taken along the line A-A of FIG. 3.

With reference to FIGS. 2-5, a connection structure of a ball valve of a control valve for draining water out of a water sink according to a preferred embodiment of the present invention comprises: a body 1, a filtration cap 2, the ball valve 3, a handle bar 4, and a positioning ring 5.

The body 1 is a hollow tube, and the body 1 includes a first connecting portion formed on a top thereof and configured to connect with the filtration cap 2, a second connecting portion 12 formed on a bottom of the first connecting portion 11 in a vertical direction of the body 1 and configured to accommodate the ball valve 3, a coupling portion 13 extending horizontally along the second connecting portion 12, and a fixing portion 14 formed on a bottom of the second connecting portion 12.

Referring to FIGS. 2-5, the body 1 further includes a discharge orifice 15 defined on an end thereof opposite to the coupling portion 13 and configured to discharge wasted water, thus discharging water efficiently.

As shown in FIGS. 2-5, the filtration cap 2 includes multiple filtering orifices 21 defined therein and configured to guide the wasted water into the body 1.

As illustrated in FIGS. 2-5, the ball valve 3 is spherical and is received in the second connecting portion 12 from a bottom of the body 1, wherein the ball valve 3 includes a guide orifice 31 passing therethrough, a connection portion 32 extending along a horizontal direction of the guide orifice 31, wherein the handle bar 4 is inserted into the coupling portion 13 and connected with the connection portion 32, then the handle bar 4 is screwed by a screw so that the ball valve 3 is engaged by the handle bar 4 to be turned on/off.

With reference to FIGS. 2-5, the positioning ring 5 is received in the fixing portion 14 from the bottom of the body 1, and the ball valve 3 includes two washers 6 fixed on a top and a bottom of the ball valve 3, thus avoiding a water leakage of the body 1.

Referring to FIGS. 2-5, the filtration cap 2 does not contact with the positioning ring 5 to cause an unflatness and a removal of the filtration cap 2. Also, the ball valve 3 and the positioning ring 5 are received in the second connecting portion 12 and the fixing portion 14 from the bottom of the body 1, thus connecting the ball valve 3, the positioning ring 5 and the body 1 easily. Preferably, the ball valve 3, the positioning ring 5 and the body 1 are detachable easily to obtain easy maintenance, and the ball valve 3 and the positioning ring 5 do not accommodate dirt.

Thereby, the connection structure of a ball valve has advantages as follows:

1) The body 1 is machined easily.

2) The filtration cap 2 does not contact with the positioning ring 5 to cause the unflatness and the removal of the filtration cap 2.

3) The ball valve 3 and the positioning ring 5 are received in the second connecting portion 12 and the fixing portion 14 from the bottom of the body 1, thus connecting the ball valve 3, the positioning ring 5 and the body 1 easily.

4) The ball valve 3, the positioning ring 5 and the body 1 are detachable easily to obtain easy maintenance, and the ball valve 3 and the positioning ring 5 do not accommodate the dirt.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A connection structure of a ball valve of a control valve for draining water out of a water sink comprising: a body, a filtration cap, the ball valve, a handle bar, and a positioning ring;

wherein the body is a hollow tube, and the body includes a first connecting portion formed on a top thereof and configured to connect with the filtration cap, a second connecting portion formed on a bottom of the first connecting portion in a vertical direction of the body and configured to accommodate the ball valve, a coupling portion extending horizontally along the second connecting portion, and a fixing portion formed on a bottom of the second connecting portion;

wherein the filtration cap includes multiple filtering orifices defined therein and configured to guide the water into the body;

wherein the ball valve is spherical and is received in the second connecting portion from a bottom of the body, wherein the ball valve includes a guide orifice passing therethrough, a connection portion extending along a horizontal direction of the guide orifice, wherein the handle bar is inserted into the coupling portion and connected with the connection portion so that the ball valve is engaged by the handle bar to be turned on/off; and wherein the positioning ring is received in the fixing portion from the bottom of the body, and the ball valve includes a washer fixed between the ball valve and the positioning ring to avoid a water leakage of the body;

wherein an inner diameter of the second connecting portion is smaller than an outer diameter of the ball valve, and an outer diameter of the positioning ring is smaller than an inner diameter of the bottom of the body so that the positioning ring and the body are detachable easily to obtain easy maintenance, and the ball valve and the positioning ring do not accommodate the dirt.

2. The connection structure of the ball valve as claimed in claim 1, wherein the filtration cap does not contact with the positioning ring, and the ball valve and the positioning ring are received in the second connecting portion and the fixing portion from the bottom of the body.

3. The connection structure of the ball valve as claimed in claim 1, wherein the body further includes a discharge orifice defined on an end thereof opposite to the coupling portion.

4. The connection structure of the ball valve as claimed in claim 1, wherein the ball valve includes two washers fixed on a top and a bottom thereof.

* * * * *